United States Patent
Lee et al.

(10) Patent No.: US 7,685,643 B2
(45) Date of Patent: Mar. 23, 2010

(54) SYSTEM AND METHOD FOR MANAGING MULTIMEDIA CONTENTS IN INTRANET

(75) Inventors: Byung-rae Lee, Yongin-si (KR); Kyung-ah Chang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1237 days.

(21) Appl. No.: 10/762,523

(22) Filed: Jan. 23, 2004

(65) Prior Publication Data

US 2004/0158712 A1 Aug. 12, 2004

(30) Foreign Application Priority Data

Jan. 24, 2003 (KR) .................. 10-2003-0004795

(51) Int. Cl.
*H04N 7/16* (2006.01)
(52) U.S. Cl. .................. 726/27; 713/189; 713/193; 380/201; 705/50
(58) Field of Classification Search ............. 726/26–33, 726/12; 713/189, 193, 150, 160, 153, 165; 709/225, 229; 380/200–201, 210; 725/30, 725/28; 705/50, 51–53, 57, 59
See application file for complete search history.

(56) References Cited

U.S. PATENT DOCUMENTS

| | | | | |
|---|---|---|---|---|
| 6,311,207 B1 * | 10/2001 | Mighdoll et al. | ............. | 709/203 |
| 6,421,733 B1 * | 7/2002 | Tso et al. | .................... | 709/246 |
| 6,704,733 B2 * | 3/2004 | Clark et al. | ................... | 707/10 |
| 6,748,080 B2 * | 6/2004 | Russ et al. | .................. | 380/239 |
| 6,782,550 B1 * | 8/2004 | Cao | ............ | 725/39 |
| 6,892,226 B1 * | 5/2005 | Tso et al. | .................... | 709/218 |
| 6,944,776 B1 * | 9/2005 | Lockhart et al. | ........... | 713/176 |
| 6,963,972 B1 * | 11/2005 | Chang et al. | ................ | 713/153 |
| 7,146,629 B2 * | 12/2006 | Tsukada et al. | ............. | 725/106 |
| 7,193,995 B1 * | 3/2007 | Solala | ........................ | 370/389 |
| 7,200,575 B2 * | 4/2007 | Hans et al. | .................... | 705/59 |
| 7,228,427 B2 * | 6/2007 | Fransdonk | .................. | 713/176 |
| 7,266,202 B1 * | 9/2007 | Kawakami et al. | .......... | 380/283 |

(Continued)

FOREIGN PATENT DOCUMENTS

JP      2000-113066 A      4/2000

(Continued)

OTHER PUBLICATIONS

Gehrmann, Christian, "Bluetooth(TM) Security White Paper," Apr. 2002. Bluetooth SIG Security Expert Group. 46 pages.*

(Continued)

*Primary Examiner*—Kimyen Vu
*Assistant Examiner*—Nirav Patel
(74) *Attorney, Agent, or Firm*—Sughrue Mion, PLLC (57) ABSTRACT

A system and method for managing non-free multimedia contents in an intranet. The system includes proxy managers provided in a server of the intranet, for example, a media center or set-top box, and clients, for example, DRM smart clients in wired/wireless digital information appliances, such as Digital TVs or PDAs. Various kinds of encrypted multimedia contents and license information are converted by the proxy managers into multimedia contents and license information having a format executable by the DRM smart clients.

24 Claims, 8 Drawing Sheets

U.S. PATENT DOCUMENTS

| | | | |
|---|---|---|---|
| 2002/0114466 A1* | 8/2002 | Tanaka et al. | 380/232 |
| 2002/0169823 A1* | 11/2002 | Coulombe et al. | 709/203 |
| 2003/0103528 A1* | 6/2003 | Kawaguchi et al. | 370/468 |
| 2003/0108205 A1* | 6/2003 | Joyner et al. | 380/277 |
| 2003/0126086 A1* | 7/2003 | Safadi | 705/51 |
| 2004/0044779 A1* | 3/2004 | Lambert | 709/229 |
| 2004/0210538 A1* | 10/2004 | Forest | 705/80 |
| 2005/0065891 A1* | 3/2005 | Lee et al. | 705/59 |
| 2005/0071280 A1* | 3/2005 | Irwin et al. | 705/59 |

FOREIGN PATENT DOCUMENTS

| | | |
|---|---|---|
| WO | WO 00/58811 A2 | 10/2000 |
| WO | WO 02/23315 A2 | 3/2002 |

OTHER PUBLICATIONS

Lu, Yi et al., "The Conditional Correlation Attack: A Practical Attack on Bluetooth Encryption," 2005. The 25th Annual International Cryptology Conference. 21 pages.*

* cited by examiner

Fig 1

PRIOR ART

Fig 2

PRIOR ART

SYSTEM AND METHOD FOR MANAGING MULTIMEDIA CONTENTS IN INTRANET

BACKGROUND OF THE INVENTION

This application claims the priority of Korean Patent Application No. 10-2003-0004795, filed on Jan. 24, 2003, in the Korean Intellectual Property Office, the disclosure of which is incorporated herein in its entirety by reference.

FIELD OF THE INVENTION

The present invention relates generally to a system and method for managing multimedia contents in an intranet (for example, a private information network including a home network or office network) including a plurality of clients (for example, personal computers or wired/wireless digital information appliances), and more particularly to a system and method for managing non-free multimedia contents in an intranet.

DESCRIPTION OF THE RELATED ART

Generally, an intranet, such as a home network system or an office network system, includes a server capable of performing Internet communications, and allows a network to be constructed between a plurality of clients, such as personal computers (PCs) or wired/wireless digital information appliances (for example, refrigerators, air conditioners, televisions (TVs), Personal Digital Assistants (PDAs) or the like), thus enabling integrative control and management to be realized.

Recently, with the rapid development of computers, the Internet, storage media and the like, various documents and contents are produced and distributed in the form of digital data readable by computers. However, due to the characteristics of these digital contents, the reproductions or modified versions of an original can be easily made and distributed. Therefore, since a writer of digital contents invests a lot of money, time and creative power, the writer desires to thoroughly protect his or her copyright whether on-line or off-line. However, illegal reproduction and distribution of such copyrighted digital contents due to the easily reproducible and distributable properties thereof is a major obstacle to the growth of digital content markets.

A streaming method is one method proposed to solve the above problem of illegal reproduction and distribution of digital contents. The streaming method enables data to be temporarily stored in a Random Access Memory (RAM), and not in a hard disk of a user. However, this method is disadvantageous in that the discontinuity, buffering and undesired mixing of moving pictures frequently occurs due to technical problems, such as communication speed or compression. Further, a program called a Hinet Recorder developed by Hoonnet Co., Ltd. of Korea in July 2001 allows Internet movies, Internet broadcasting and music, moving picture lectures, music videos and the like, which are always provided by the streaming method, to be downloaded simultaneously with streaming. This demonstrates that a digital content service, provided by the streaming method, is unable to prevent illegal reproduction.

Therefore, in order to protect copyrights on digital contents, interest in Digital Rights Management (DRM) systems has recently increased. Such a DRM system is based on a technique for protecting various digital contents, such as texts, music files, images, pictures, moving picture lectures, movies, software and games, which have been distributed through various channels, against illegal reproduction, and enabling a non-free content service to be continuously provided. Recently, interest in the DRM system has greatly increased due to the judgment of service discontinuance against Napster, which is a free music download Web site originated in the United States, and a lawsuit of the property right council against Soribada, which is a Korean Napster-like Web site. Further, after much research and development and commercialization, the DRM system has progressed as the only solution capable of solving this copyright infringement argument. Therefore, if a content provider introduces the DRM system, digital contents distributed through all networks can be opened only when rules and use policies decided by the content provider are satisfied. Further, even though illegal reproduction is attempted, since all digital contents are encrypted, users who are not paying a certain fee cannot open illegally reproduced files.

The construction of this conventional DRM system is described with reference to the attached drawings.

Figure 1:
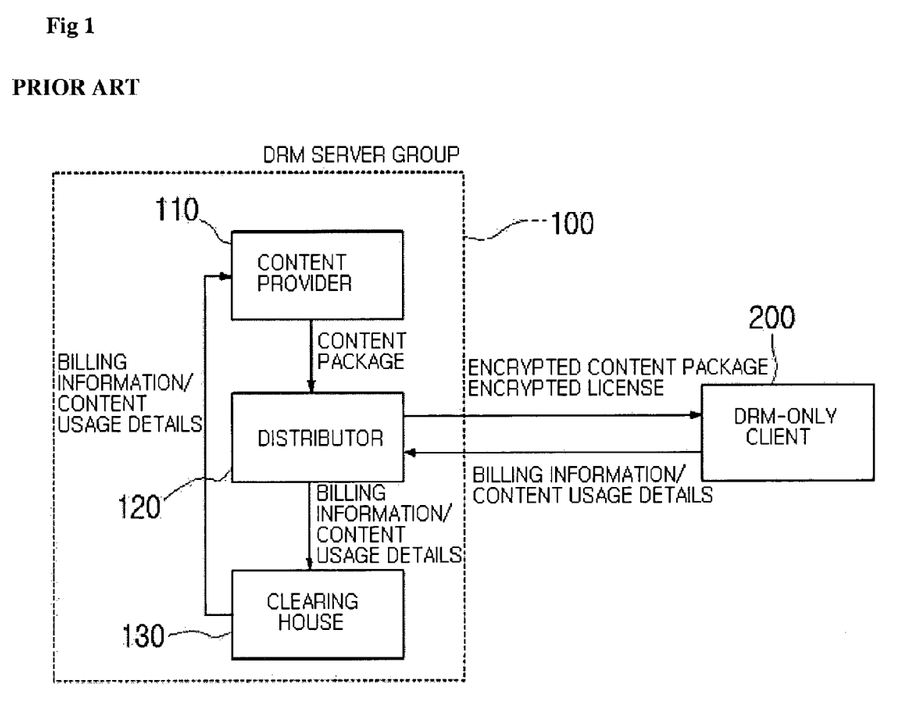
FIG. 1 is a block diagram showing the entire construction of a conventional DRM system.
Figure 2:
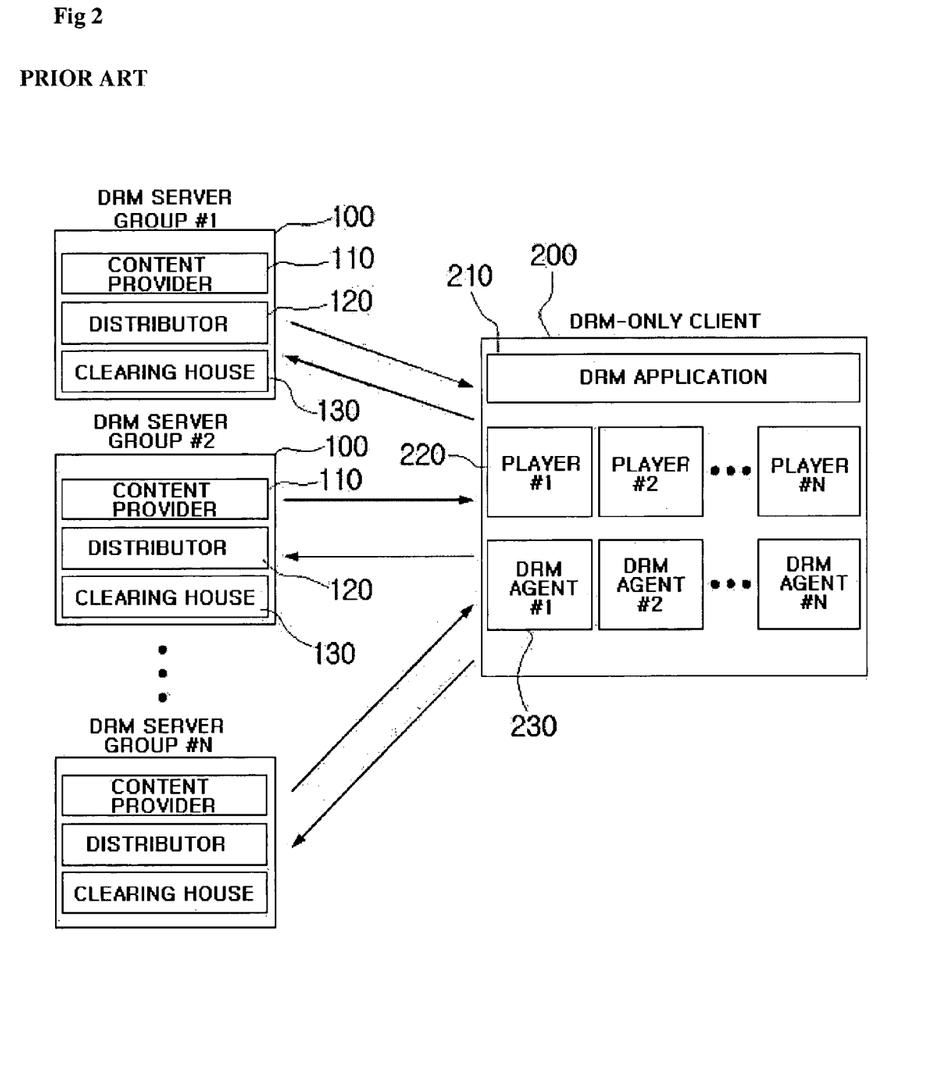
FIG. 2 is a block diagram showing the construction of a conventional DRM server group and a conventional DRM-only client.

FIG. 1 is a block diagram showing the entire construction of the conventional DRM system, and FIG. 2 is a block diagram showing the construction of a conventional DRM server group and a conventional DRM client for exclusive use of the DRM server group (hereinafter referred to as 'DRM-only client').

As shown in FIG. 1, the conventional DRM system is implemented on the basis of a server-client system in the Internet environment, and comprises a DRM server group 100 comprised of a content provider 110, a distributor 120 and a clearing house 130, and a DRM-only client 200 subordinate to the DRM server group 100.

In this case, the content provider 110 carries out the writing of multimedia contents and packaging process of contents and metadata, and provides the packaging-processed content package to the distributor 120. The distributor 120 provides the content package received from the content provider 110 to an authenticated user in the form of a package combined with an encrypted license, or a package separate from the encrypted license. At this time, the clearing house 130 checks both billing information and content usage details on the basis of content usage details received from the distributor 120 in connection with a billing system (not shown) and reports the checked results to the content provider 110.

The conventional DRM server group 100 uses a unique DRM solution at a multimedia content generating and distributing step and a billing information and usage details managing step.

That is, the content provider 110 processes multimedia contents and unique usage/business rules together with metadata using a corresponding DRM solution to generate a unique content package.

Further, contents distribution is performed by allowing the distributor 120 to transfer a content package protected by unique encryption/decryption techniques, Public Key Infrastructure (PKI)/key management system and the like to a user system. At this time, multimedia contents and authority information (license) are defined in the form of a combined package or separate packages depending on the service policies of the DRM server group 100.

Therefore, when a DRM application 210 of desired multimedia contents for the DRM server group 100 is executed, it is certified that a client is the DRM-only client 200, as shown in FIG. 2. Further, a unique player 220 and a corresponding DRM agent plug-in 230, to which the multimedia contents packaging techniques, the encryption/decryption techniques and the key management system intended by the DRM server group 100 can be applied, must be installed. If the DRM agent plug-in 230 and the unique player 220 which are compatible with each other do not exist in the system, a corresponding service must be carried out after the DRM agent plug-in or the unique player is newly installed.

That is, in order to use contents, a user system checks whether a DRM-only client 200 for a corresponding DRM solution has been installed through the DRM application 210 linked to the content package received from the distributor 120. The DRM agent plug-in 230 of the DRM-only client 200 controls the player 220 to allow the user to use multimedia contents with authority after the user is authenticated and authority information for multimedia contents is applied in a plug-in manner. If the DRM agent plug-in 230 providing compatibility is not installed, the DRM server group 100 informs the user of an address of a Web site from which a DRM agent plug-in and a player can be downloaded, thus enabling the DRM agent plug-in to be installed in the user system.

Consequently, most DRM solutions used in DRM server groups 100 support multimedia contents, authority information protection techniques and the like on the basis of the unique DRM agent plug-ins 230, as shown in FIG. 2, and some DRM solutions share information of the DRM agent plug-ins 230.

Therefore, in order to use a non-free multimedia content service in wired/wireless digital information appliances constituting a private information network, such as a home network or office network, the DRM-only client 200 subordinate to the DRM server group 100 must be used. Further, as shown in FIG. 2, if various multimedia content services processed by various companies are required to be used in a single appliance, a plurality of DRM-only clients corresponding to respective DRM server groups 100 must be installed to allow all of the content services to be performed.

For example, if a DRM application provided by Microsoft Corporation is required to be used in a user system in which only a DRM solution provided by RealPlayer Corporation is installed, the user must additionally install Windows Media Player and Windows Media Rights Manager (WMRM). Therefore, the user system would include a plurality of DRM support players 220 and DRM agent plug-ins 230.

However, the construction of the conventional DRM system for wired/wireless digital information appliances has certain problems, as described below.

First, if services for various multimedia contents processed by a plurality of companies are required to be used in clients belonging to an intranet, unique DRM-only agents and players for DRM solutions corresponding to respective DRM server groups must be installed in each of the clients, thus unnecessarily consuming resources and processing time.

Second, as compared to a conventional Internet-based computing environment, since wired/wireless digital information appliances (for example, refrigerators, air conditioners, TVs, PDAs and the like) have limited computing abilities and limited compatibilities with various multimedia DRM service protocols relative to a PC or the like, it is difficult to apply the conventional DRM system to the intranet in which these wired/wireless digital information appliances are clients.

Third, in the case of the intranet in which a client turnover rate according to the participation/withdrawal of clients is high, for example, in which the clients are wireless digital information appliances, since the participation of the wireless digital information appliances and the withdrawal thereof due to the movement of users frequently occurs, it is difficult to flexibly manage the intranet using the conventional DRM system.

SUMMARY

Accordingly, the present invention has been made keeping in mind the above problems occurring in the prior art, and an aspect of the present invention is to provide a system and method for managing multimedia contents, in which there is no need to install DRM-only agents and players according to DRM server groups in each of clients in an intranet including a plurality of clients to use contents provided by DRM server groups.

Another aspect of the present invention is to provide a system and method of managing multimedia contents, which is suitable for an intranet including clients having limited computing abilities and limited compatibilities with various DRM service protocols.

A further aspect of the present invention is to provide a system and method for managing multimedia contents suitable for the intranet in which frequent participation/withdrawal of clients occurs.

Additional aspects and advantages of the invention will be set forth in part in the description which follows and, in part, will be obvious from the description, or may be learned by practice of the invention.

In order to accomplish the above aspects, the present invention provides a system for managing multimedia contents in an intranet, comprising a server for converting multimedia contents received through the Internet into multimedia contents having a format suitable for at least one client of the intranet and transmitting the converted multimedia contents to the client.

Consistent with the present invention, the server may translate a license received through the Internet to be suitable for the client of the intranet and additionally transmit the translated license to the client. Consistent with the present invention, the converted multimedia contents or the translated license are encrypted and transmitted to the client. In this case, the encryption may be performed using a group key of the server.

Consistent with the present invention, the server may comprise a plurality of proxy managers constructed according to DRM server groups, the proxy managers each comprising a platform authentication unit for requesting a license for multimedia contents from a corresponding DRM server group which provides the multimedia contents, and performing registration of the client; a content conversion unit for decrypting multimedia contents received from the corresponding DRM server group, and converting the decrypted multimedia contents into multimedia contents having a format suitable for the client; and a license translation unit for translating a license received from the corresponding DRM server group into a license having a format suitable for the client.

Consistent with the present invention, the proxy manager may further comprise a report billing unit for arranging multimedia content usage details of the client, transmitting the arranged multimedia content usage details to the DRM server group, and transmitting information relating to billing.

In addition, the present invention provides a system for managing multimedia contents in an intranet, comprising at least one client for receiving and executing multimedia contents, converted by a server of the intranet into multimedia contents having a format suitable for the client of the intranet.

Consistent with the present invention, the client may additionally receive a license translated to be suitable for the client of the intranet by the server. Consistent with the present invention, the multimedia contents converted by the server or the license translated by the server are encrypted and transmitted to the client. In this case, the encryption may be performed using a group key of the server.

Consistent with the present invention, the client may comprise an authentication and access control unit for performing registration of the client on the server and access to the server; a content decryption unit for decrypting the multimedia contents which are encrypted and transmitted; and a rights management unit for decrypting the license which is encrypted and transmitted, and checking whether the decrypted multimedia contents are executed in the client to be suitable for the decrypted license.

Consistent with the present invention, if the multimedia contents converted by the server or the license translated by the server are encrypted using the group key of the server and transmitted to the client, the decryption performed by the client may be carried out using a client key corresponding to the group key of the server.

Consistent with the present invention, the client may further comprise a report unit for transmitting usage details of the transmitted multimedia contents to the server so as to report the multimedia content usage details to the server.

In addition, the present invention provides a method of managing. multimedia contents in an intranet, comprising converting multimedia contents received through the Internet into multimedia contents having a format suitable for at least one client of the intranet and transmitting the converted multimedia contents to the client by a server of the intranet.

Consistent with the present invention, the multimedia content management method may further comprise translating a license received through the Internet to be suitable for the client of the intranet and transmitting the translated license to the client by the server. Consistent with the present invention, the multimedia content management method may further comprise encrypting the converted multimedia contents or the translated license. In this case, the encryption of the converted multimedia contents or the translated license may be performed using a group key of the server.

Consistent with the present invention, the multimedia content management method may further comprise receiving multimedia content usage details of the client by the server; and arranging the multimedia content usage details of the client and transmitting the arranged multimedia content usage details to a DRM server group so as to report multimedia content usage details of the client in the intranet to the DRM server group.

Consistent with the present invention, information relating to billing as well as the multimedia content usage details may also be transmitted to the DRM server group.

In addition, the present invention provides a method of managing multimedia contents in an intranet, comprising receiving and executing multimedia contents, converted by a server of the intranet into multimedia contents having a format suitable for at least one client of the intranet, by the client.

Consistent with the present invention, the multimedia content management method may further comprise receiving a license translated to be suitable for the client of the intranet by the server. Consistent with the present invention, the multimedia contents converted by the server or the license translated by the server are encrypted and transmitted to the client. In this case, the encryption of the converted multimedia contents or the translated license may be performed using a group key of the server.

Consistent with the present invention, if the converted multimedia contents or the translated license are encrypted using the group key of the server and transmitted to the client, the decryption performed by the client may be carried out using a client key corresponding to the group key of the server.

Consistent with the present invention, the multimedia content management method may further comprise decrypting the encrypted multimedia contents; decrypting the encrypted license; and checking whether the decrypted multimedia contents are executed in the client so as to be suitable for the decrypted license.

Consistent with the present invention, the multimedia content management method may further comprise transmitting usage details of the transmitted multimedia contents to the server so as to report the multimedia content usage details of the client in the intranet to the server.

BRIEF DESCRIPTION OF THE DRAWINGS

The above and other aspects, features and other advantages of the present invention will be more clearly understood from the following detailed description taken in conjunction with the accompanying drawings, in which.

DESCRIPTION OF THE EXEMPLARY EMBODIMENTS

In the present invention, an intranet includes networks, such as a home network or office network, having a server capable of performing Internet communications and a plurality of clients, and includes wired and wireless networks.

Further, the server of the intranet of the present invention is a concept including all devices, such as media centers, set-top boxes or PCs, having computing abilities capable of converting or encrypting predetermined multimedia contents and translating or encrypting predetermined electronic licenses.

Further, the client of the intranet of the present invention is a concept including all devices capable of executing predetermined multimedia contents, such as PCs or wired/wireless digital information appliances (for example, refrigerators, air conditioners, TVs, PDAs or the like).

Hereinafter, embodiments of a system and method for managing multimedia contents in an intranet according to the present invention as characterized above will be described in detail with reference to the attached drawings.

For convenience of description, embodiments of a multimedia content management system in an intranet according to the present invention will be described on the basis of a private information network including a home network or office network in which PCs or wired/wireless digital information appliances are clients. However, it should be noted that the intranet of the present invention is not limited to the private information network.

Figure 3:
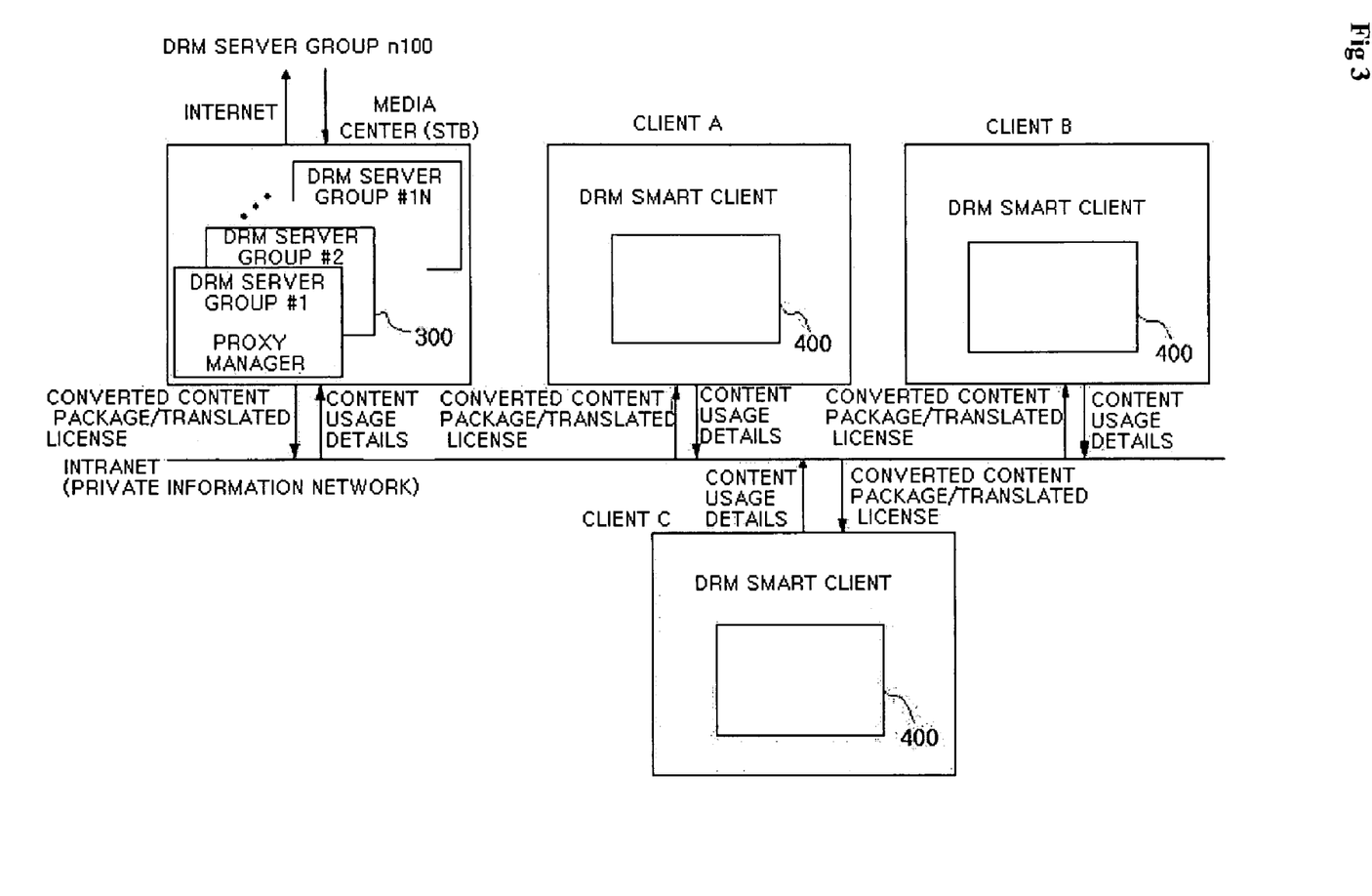
FIG. 3 is a block diagram showing the construction of a system for managing multimedia contents according to the present invention.

FIG. 3 is a block diagram showing the construction of a system for managing multimedia contents according to the present invention.

As shown in FIG. 3, the multimedia content management system of the present invention comprises proxy managers 300 provided in a server for performing a service connection to an external network in a private information network comprised of wired/wireless digital information appliances, that is, a media center or set-top box, and DRM smart clients 400 provided in clients. The clients can be implemented by wired/wireless digital information appliances, such as electrical home appliances, Web pads, PDAs or digital TVs, and the participation and withdrawal of the DRM smart clients 400 in/from the private information network can be controlled by registration on the proxy managers 300.

That is, each of the proxy managers 300 in the media center or set-top box is a main component for representing a private information network with respect to a certain DRM server group n 100 of a conventional Internet-based non-free multimedia content distribution network, and performs communication relating to services with the DRM server group n 100 as a DRM-only client by generating a proxy according to a unique DRM solution of each of the DRM server groups 100.

Therefore, the DRM server group n 100 performs the same protocol as the conventional non-free multimedia content service together with the proxy manager 300 representing the clients of the private information network, that is, wired/wireless digital information appliances. Thereafter, the proxy manager 300 converts corresponding contents and authority information into a format acceptable by the DRM smart client 400 of each of the clients.

In the multimedia content management system of the present invention, since the proxy manager 300 in the media center or set-top box is provided with respect to each DRM server group n 100 having a unique DRM solution, a plurality of proxy managers 300 #1 to #N are created in a single media center or set-top box to use DRM server group n 100. Each of the proxy managers 300 is operated as a main component for representing the private information network with respect to each DRM server group n 100 having a unique DRM solution.

The operations of the proxy manager 300 and the DRM smart client 400 are described in brief. A proxy manager n 300 operating as a main component representing the private information network with respect to a certain DRM server group n 100 exists. The proxy manager n 300 converts encrypted multimedia contents received from the certain DRM server group n 100 into multimedia contents having a format suitable for clients existing in the private information network, translates a license, which is encrypted and transmitted, to be suitable for the clients, and transmits the converted multimedia contents and translated license to respective clients. Consistent with the present invention, the converted multimedia contents may be single-format contents (for example, Moving Picture Experts Group (MPEG), etc.) previously designated in the private information network. In this case, each of the clients may include only a single player. Further, the translated license can be a license, authority of which (for example, the number of uses, use time, etc.) is translated to be suitable for the clients registered on the private information network, for example, electrical home appliances, Web pads, PDAs, and digital TVs.

The converted multimedia contents and the translated license are transmitted to the clients registered on the private information network and executed by the DRM smart clients 400 provided in respective clients. Usage details of contents used by the DRM smart clients 400 are transmitted again to the proxy manager n 300 in the media center or set-top box. The proxy manager n 300 arranges content usage details of respective clients of the private information network and reports the arranged content usage details to the DRM server group n 100 as a main component representing the private information network with respect to the DRM server group n 100.

By the above-described system, each of the clients of the private information network includes a single DRM smart client 400 which can use a number of multimedia contents regardless of each DRM server group n 100 having a unique DRM solution. Further, in the case where multimedia contents transmitted in various formats are converted into single-format contents (for example, MPEG format) by the proxy manager 300, since each of the clients need include only a player for executing single-format contents, the above system is useful for a private information network comprised of clients having limited computing abilities.

Further, even in the case of a private information network comprised of clients having sufficient computing abilities, it is only necessary to vary a proxy manager 300 in the media center or set-top box when a variation, such as the addition or deletion of an external DRM server group n 100, occurs, thus increasing management efficiency for a network.

Hereinafter, the construction of each of the proxy managers 300 is described in detail with reference to FIG. 4.

The proxy manager 300 of the present invention is comprised of a platform authentication unit 310, a content conversion unit 320 and a license translation unit 330.

The platform authentication unit 310 performs initialization for services with the DRM server group 100 as a main component representing the private information network, and requests a license for multimedia contents suitable for the private information network from the DRM server group 100. Further, the platform authentication unit 310 performs the registration of clients constituting the private information network, that is, wired/wireless digital information appliances, and the management of certificates and encryption keys.

The content conversion unit 320 decrypts multimedia contents received from the DRM server group, and converts the decrypted multimedia contents into multimedia contents having a predetermined format. As described above, the converted multimedia contents can be single-format contents (for example, MPEG) previously designated in the private information network.

Meanwhile, the converted multimedia contents may be encrypted in a suitable format by the content conversion unit 320 and transmitted to each of the DRM smart clients 400. In order to perform the encryption, an encryption technique, for example, a Public Key Infrastructure (PKI) technique, can be used. In this case, the platform authentication unit 310 generates certificates for authenticating wired/wireless digital information appliances and encryption keys, and manages the certificates and the encryption keys.

The license translation unit 330 translates authority information defined in the DRM server group, that is, a license, in the format suitable for respective DRM smart clients 400 of registered wired/wireless digital information appliances. As described above, the translated license can be a license, the authority of which (for example, the number of uses, use time, etc.) is translated to be suitable for the clients registered in the private information network, for example, electrical home appliances, Web pads, PDAs and digital TVs. The license can be encrypted in a suitable format and then transmitted to each of the DRM smart clients 400, similar to the multimedia contents. Further, similar to the converted multimedia contents, an encryption technique, for example, Public Key Infrastructure (PKI), can be used so as to perform the encryption.

Figure 4:
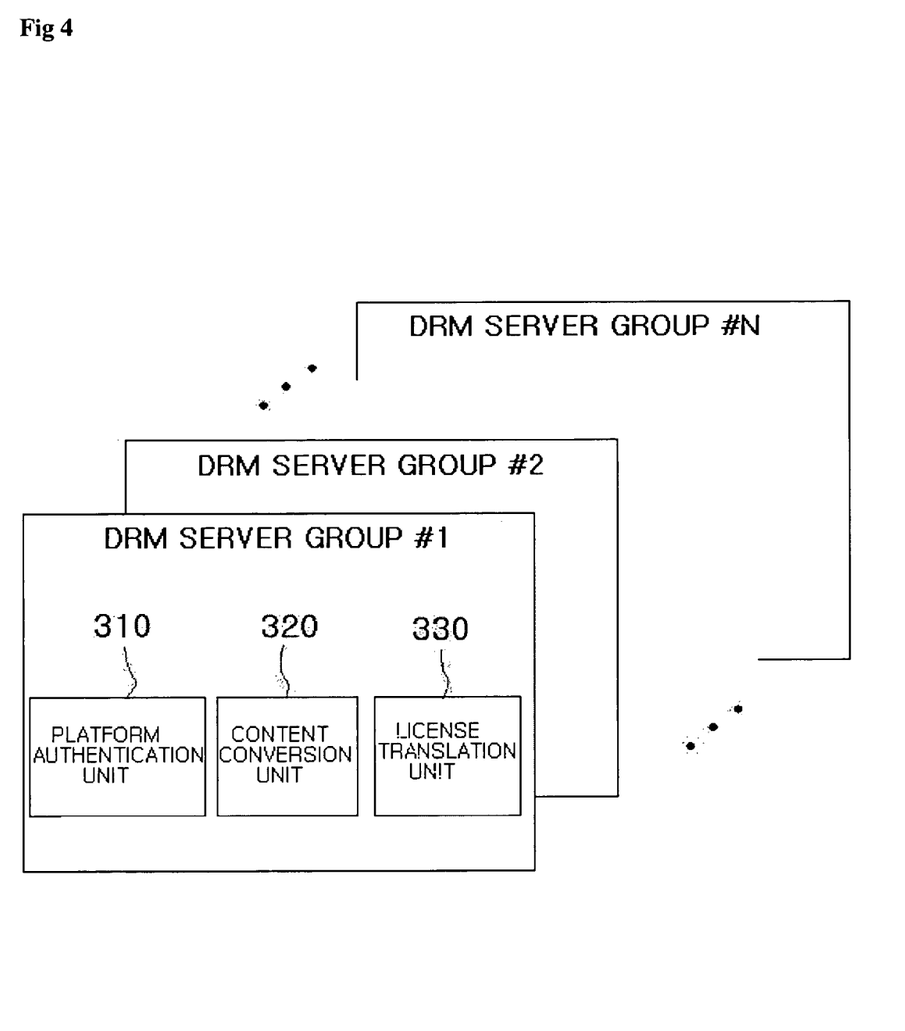
FIG. 4 is a block diagram showing the detailed construction of a proxy manager according to the present invention.

Meanwhile, although not shown in FIG. 4, the system may further comprise a report/billing unit which arranges multimedia content usage details of the clients of the private information network after receiving the multimedia content usage details, transmits the arranged multimedia content usage details to the DRM server group 100, and further transmits information relating to billing thereto.

Hereinafter, the construction of each of the DRM smart clients 400 is described in detail with reference to FIG. 5.

The DRM smart client 400 in the wired/wireless digital information appliance is a single DRM-only client provided in a client, and is able to operate independently of the DRM solutions of the DRM server groups 100. The participation and withdrawal of the clients in and from the private information network is controlled by the registration on the platform authentication unit 310 of the proxy manager 300.

The DRM smart client 400 comprises an authentication and access control unit 410, a content decryption unit 420 and a rights management unit 430.

The authentication and access control unit 410 performs the registration of clients on the private information network, the storage of certificates for authentication of the clients, and the access of the clients to the private information network in communication with the platform authentication unit 310 of the proxy manager 300.

If the multimedia contents are encrypted in a suitable format and then transmitted, for example, if an encryption technique, such as the PKI, is applied, the content decryption unit 420 decrypts and executes the multimedia contents encrypted by the proxy manager 300 through a certificate received from the proxy manager 300 after registration. An encryption method and a key management method on the intranet, proposed in the multimedia content management system and method in an intranet according to the present invention, will be described in detail later with reference to FIG. 6. Therefore, the description thereof is omitted here.

If the translated license is encrypted using a predetermined encryption method and then transmitted to the DRM smart client 400, for example, if an encryption technique, such as the PKI, is applied, the rights management unit 430 decrypts the encrypted license through a certificate received from the proxy manager 300 after registration, and supports the control of the proxy manager 300 by checking whether the multimedia contents are executed to be suitable for the decrypted license.

Figure 5:
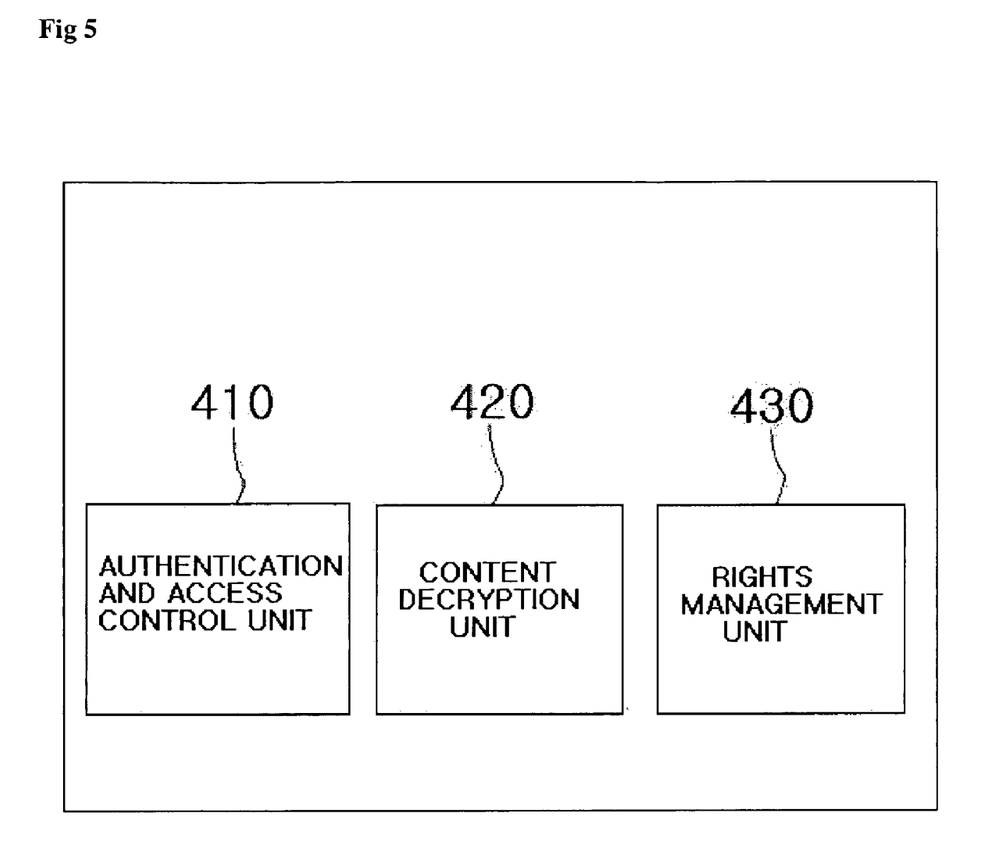
FIG. 5 is a block diagram showing the detailed construction of a DRM smart client according to the present invention.

Meanwhile, although not shown in FIG. 5, the system may further comprise a report/billing unit which transmits multimedia content usage details of clients on the private information network to the proxy manager 300 so as to report the content usage details.

Figure 6:
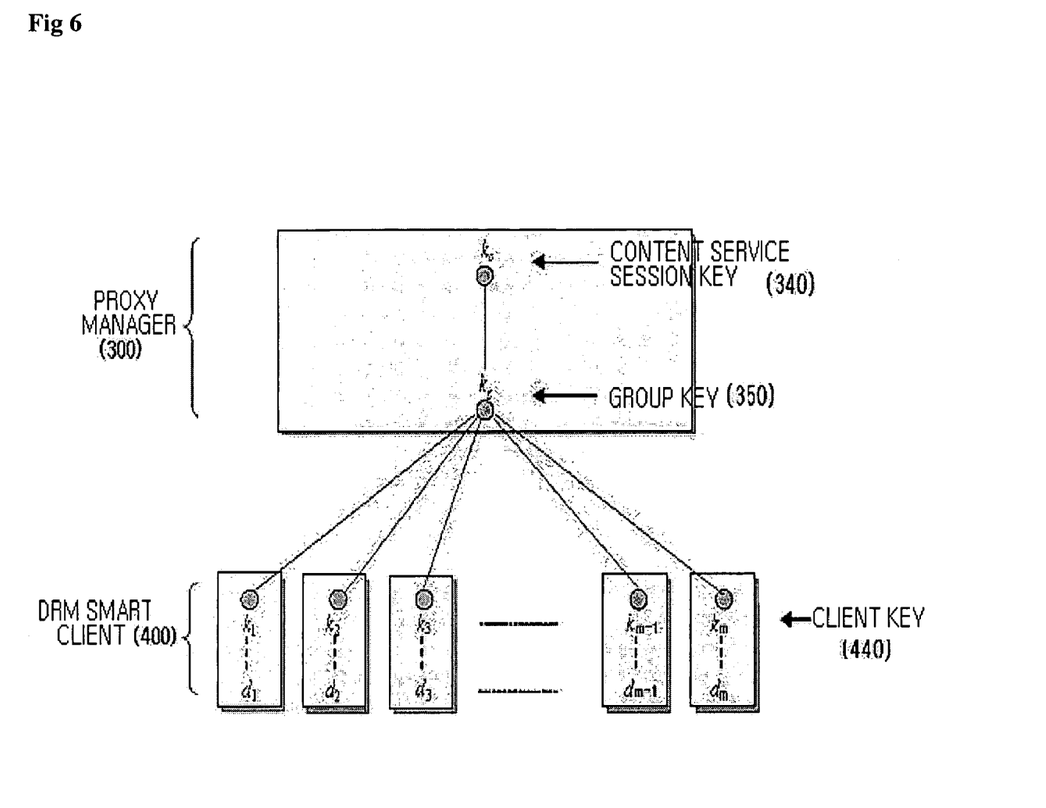
FIG. 6 is a view showing a key management method for dynamic group communication according to the present invention.

FIG. 6 is a view showing an encryption method and a key management method in an intranet proposed in the multimedia content management system and method in an intranet according to the present invention, especially showing a dynamic key management method for dynamic group communication.

Such a dynamic key management method provides a method capable of stably managing multimedia contents and license regardless of the participation and withdrawal of clients under a network environment in which the clients of the private information network, for example, wireless appliances, frequently participate in the private information network or withdraw therefrom.

Hereinafter, the dynamic key management method is described in detail with reference to FIG. 6.

If an encryption technique using the PKI is used, the platform authentication unit 310 of the proxy manager 300, which generates and manages certificates for authenticating wired/wireless digital information appliances and encryption keys, manages the registration of the clients and the issue of certificates of the appliances by monitoring participation and withdrawal states of the clients at any time with the movability of the clients taken into consideration, and broadcasts the monitored results to the DRM smart clients 400 by reflecting the monitored results on management policies for a group key 350.

At this time, client keys 440 (kl to km) are assigned to registered DRM smart clients 400 through the platform authentication unit 310 of the proxy manager 300.

The client keys 440 (kl to km) are used to decrypt multimedia contents and a license, wherein the multimedia contents are obtained by the proxy manager 300 decrypting encrypted multimedia contents received from the DRM server group 100 using a content service session key 340 (kc), re-encrypting the decrypted multimedia contents using a group key 350 (kg) of the proxy manager 300 and then transmitting the re-encrypted multimedia contents to the clients.

Meanwhile, each of the DRM smart clients of the digital information appliances containing the client keys 440 can periodically request the verification of usefulness of a currently assigned client key 400 from the proxy manager 300 while a multimedia content service is provided. Through such periodic verification, the proxy manager 300 monitors the participation and withdrawal states of the clients at any time, and reflects the monitored results on management policies for the group key 350, thus increasing security and efficiency of the private information network.

Figure 7:
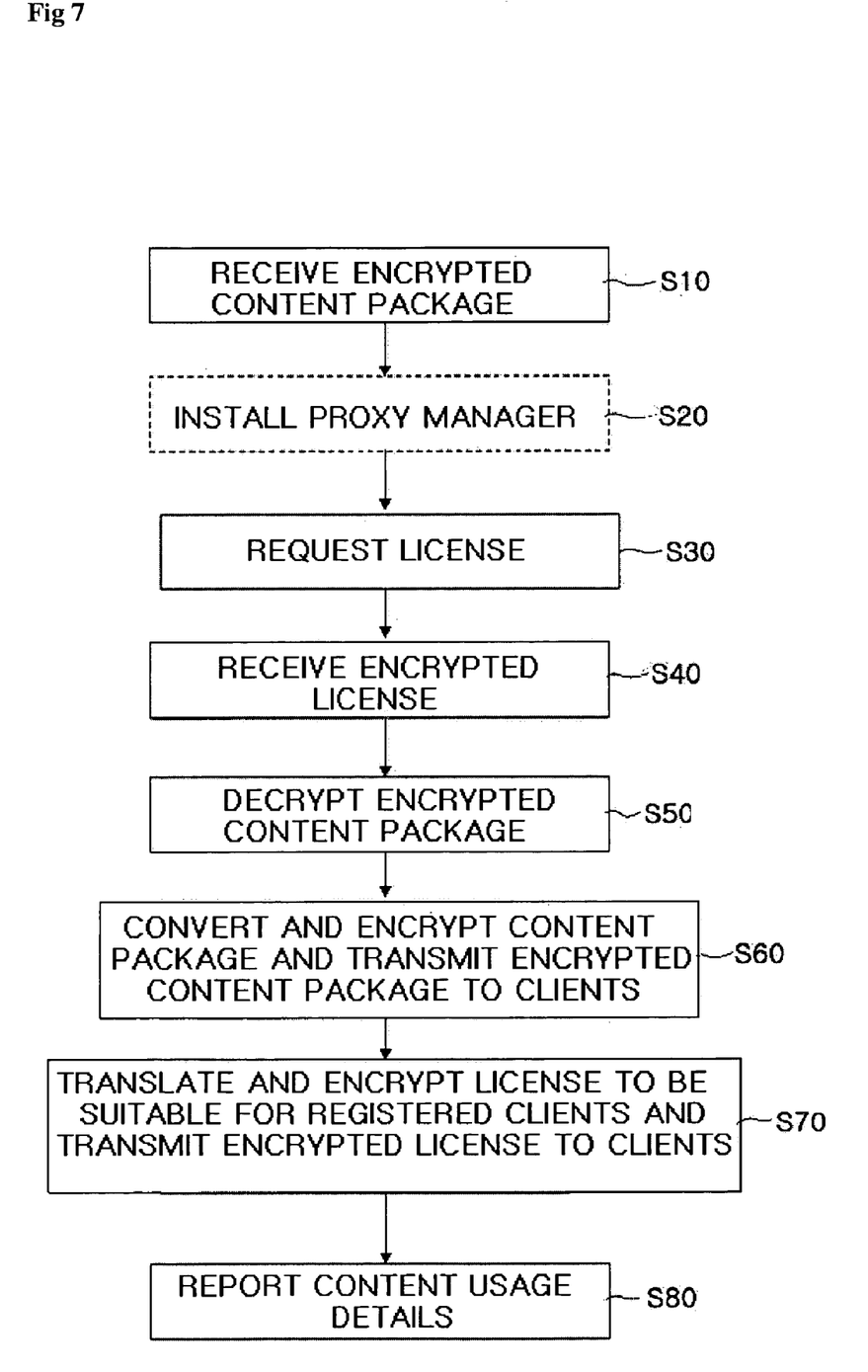
FIG. 7 is a flowchart showing an operation between the DRM server group and the proxy manager according to the present invention.

FIG. 7 is a flowchart showing the operation between the proxy manager 300 and the DRM server group 100 according to the present invention.

First, the media center or set-top box receives an encrypted multimedia content package from the DRM server group 100 in response to a user's request for non-free multimedia contents at step S10.

Meanwhile, the media center or set-top box checks whether a proxy manager 300, corresponding to a DRM solution of the received multimedia content package, is installed in the media center or set-top box and whether a proxy for a corresponding DRM server group is generated, and installs a proxy manager 300 corresponding to the DRM server group if the corresponding proxy manager 300 is not installed at step S20.

Thereafter, the proxy manager 300 performs initialization for a non-free multimedia content service with the DRM server group 100 and requests a license for sharing multimedia contents among wired/wireless information appliances in the private information network from the DRM server group 100 using the platform authentication unit 310 of the proxy manager 300 at step S30.

Whether the license is approved is determined according to business policies of the DRM server group 100. When the license is approved at step S40, the content conversion unit 320 of the proxy manager 300 decrypts the multimedia content package using the content service session key 340 at step S50. The content conversion unit 320 of the proxy manager 300 converts the decrypted content package again into multimedia contents having a format suitable for clients in the private information network. As described above, the converted multimedia contents may be single-format multimedia contents (for example, MPEG) previously designated in the private information network.

Meanwhile, the converted multimedia contents can be encrypted in a suitable format by the content conversion unit 320 and transmitted to each of the DRM smart clients 400 at step S60. In order to perform the encryption, an encryption technique, such as the PKI, can be used. In this case, the above-described platform authentication unit 310 generates and manages certificates for authenticating the wired/wireless digital information appliances and encryption keys.

Thereafter, the license translation unit 330 translates authority information defined by the DRM server group, that is, a license, into a license having a format suitable for DRM smart clients 400 of the registered wired/wireless digital information appliances. As described above, the translated license may be a license, authority of which (for example, the number of uses, use time, etc.) is converted to be suitable for the clients registered on the private information network, for example, electrical home appliances, Web pads, PDAs or digital TVs. The license can be encrypted in a suitable format and transmitted to each of the DRM smart clients 400, similar to the multimedia contents, at step S70.

As described, in order to encrypt the multimedia contents and the license, an encryption technique, such as the PKI, can be used. In this case, both the content conversion unit 320 and the license translation unit 330 can perform the encryption using the group key 440 of the private information network.

Thereafter, the report/billing unit (not shown) of the proxy manager 300 collects information of multimedia content usage details of the wired/wireless digital information appliances of the private information network and other information and reports the collected information to the DRM server group 100 at step S80.

Figure 8:
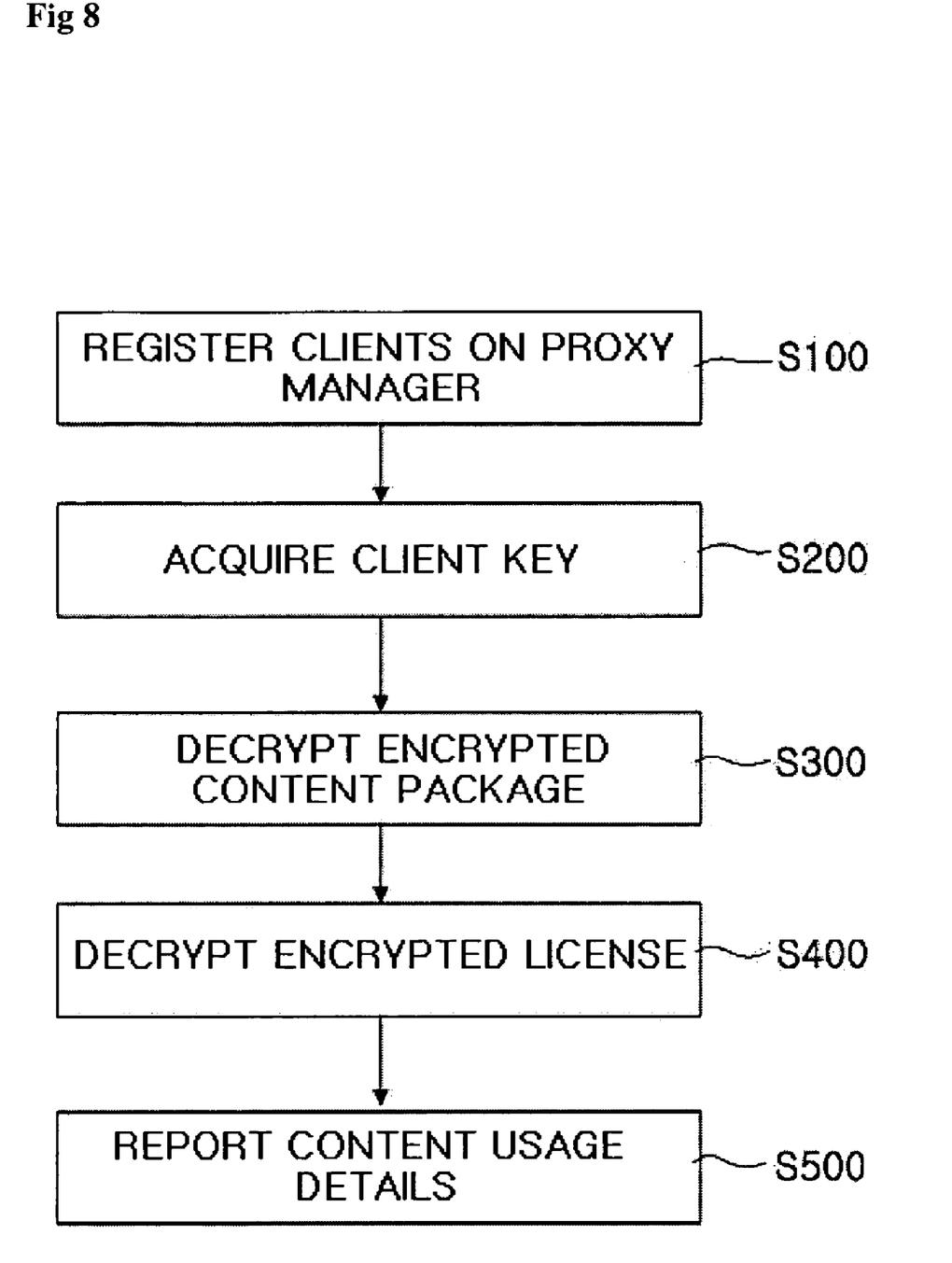
FIG. 8 is a flowchart showing an operation between the proxy manager and the DRM smart client according to the present invention.

FIG. 8 is a flowchart showing the operation between the proxy manager and the DRM smart client according to the present invention.

First, the DRM smart client 400 of each of the wired/wireless digital information appliances performs authentication and access control of the wired/wireless digital information appliance with respect to the platform authentication unit 310 of the proxy manager 300 through the authentication and access control unit 410 before a multimedia content service is requested at step S100.

That is, the registration of wired/wireless digital information appliances, the issue of certificates thereof, and the assignment of client keys are performed through the platform authentication unit 310 of the proxy manager 300 before or after a user's request for a non-free multimedia service. At this time, the DRM smart client 400 acquires the client key 440, and checks initial registration information and execution time information with respect to previously registered appliances at step S200.

After that, the DRM smart client 400 receives non-free multimedia contents, which are converted and encrypted by the content conversion unit 320 of the proxy manager 300. If the multimedia contents are encrypted and transmitted, for example, if an encryption technique, such as the PKI, is applied, the content decryption unit 420 of the DRM smart client 400 decrypts and executes the encrypted multimedia contents using the client key 440 received from the proxy manager 300 after registration at step S300.

Meanwhile, when the license translated and encrypted by the license translation unit 330 of the proxy manager 300 is received, the rights management unit 430 of the DRM smart client 400 decrypts the encrypted license using the client key 440 received from the proxy manager 300 after registration, and checks whether the multimedia contents are executed to be suitable for the decrypted license, if the license is encrypted and transmitted to the DRM smart client 400, for example, if an encryption technique, such as the PKI, is applied, at step S400.

Thereafter, the DRM smart client 400 reports multimedia content usage details of the client of the private information network to the proxy manager 300 at step S500.

Although the exemplary embodiments of the present invention have been disclosed for illustrative purposes, those skilled in the art will appreciate that various modifications, additions and substitutions are possible, without departing from the scope and spirit of the invention. For example, the above-described proxy managers and the DRM smart clients can be implemented by software as well as hardware within the scope not departing from the technical spirit of the present invention, and, alternatively, only a part of them can be implemented by software. Meanwhile, the above embodiments are described using a private information network as an example. However, the present invention can be applied to all intranets comprised of a plurality of clients, and it should be noted that the addition and modification of essential components according to the aspects or characteristics of respective intranets also belong to the technical scope of the present invention.

As described above, the present invention provides a system and method for managing multimedia contents in an intranet, which has the following advantages.

First, in the present invention, clients of the intranet, executing various multimedia contents, can operate independently of DRM server groups, and the type of programs installed in the clients to execute multimedia contents can be unified or reduced, thus reducing the overload of the clients.

Second, since the overload of the clients can be reduced, a conventional DRM system can be applied even to an intranet including clients having low computing abilities.

Third, through a dynamic key management method, non-free multimedia contents and licenses can be stably executed or managed even in an intranet in which a client turnover rate according to the frequent participation and withdrawal of clients is high.

What is claimed is:

1. A system for managing multimedia contents in an intranet, comprising:
 a server, comprising a processor and a memory, wherein if the server receives multimedia contents from one of a plurality of DRM server groups having a unique DRM solution respectively, the server performs communication relating to services with the corresponding DRM server group according to the DRM solution of the received multimedia contents, converts the received multimedia contents into multimedia contents having a format suitable for at least one client of the intranet and transmits the converted multimedia contents to the client;
 wherein the server comprises a plurality of proxy managers constructed according to DRM server groups, the proxy managers each comprising:
 a platform authentication unit operable to request a license for multimedia contents from a corresponding DRM server group which provides the multimedia contents, and performing registration of the client;
 a content conversion unit operable to decrypt multimedia contents received from the corresponding DRM server group, and converting the decrypted multimedia contents into multimedia contents having a format suitable for the client; and a license translation unit operable to translate a license received from the corresponding DRM server group into a license having a format suitable for the client, wherein each DRM server group has the unique DRM solution to be executable on different applications, wherein the converted multimedia contents are encrypted and transmitted to the client; and wherein the encrypted is performed using a group key of the server.

2. The multimedia content management system according to claim 1, wherein the server translates a license received through the Internet to be suitable for the client of the intranet and additionally transmits the translated license to the client.

3. The multimedia content management system according to claim 2, wherein the translated license is encrypted and transmitted to the client.

4. The multimedia content management system according to claim 2, wherein the proxy manager further comprises a report/billing unit operable to arrange multimedia content usage details of the client, and to transmit the arranged multimedia content usage details to the DRM server group, and to transmit information relating to billing.

5. A system for managing multimedia contents in an intranet, comprising:

at least one client operable to receive and execute multimedia contents, converted by a server, comprising a processor and a memory, of the intranet into multimedia contents having a format suitable for the client of the intranet, wherein if the server receives multimedia contents from one of a plurality of DRM server groups having a unique DRM solution respectively, the server performs communication relating to services with the corresponding DRM server group according to the DRM solution of the received multimedia contents, converts the received multimedia contents into multimedia contents having a format suitable for at least one client of the intranet and transmits the converted multimedia contents to the client;

wherein the server comprises a plurality of proxy managers constructed according to DRM server groups, the proxy managers each comprising:

a platform authentication unit operable to request a license for multimedia contents from a corresponding DRM server group which provides the multimedia contents, and performing registration of the client;

a content conversion unit operable to decrypt multimedia contents received from the corresponding DRM server group, and converting the decrypted multimedia contents into multimedia contents having a format suitable for the client; and a license translation unit operable to translate a license received from the corresponding DRM server group into a license having a format suitable for the client, wherein each DRM server group has the unique DRM solution to be executable on different applications;

wherein the license translated by the server is encrypted and transmitted to the client;

wherein the encryption of the license is performed using a group key of the server; and wherein the client comprises:

a rights management unit operable to decrypt the license which is encrypted and transmitted, and to check whether decrypted multimedia contents are executed in the client to be suitable for the decrypted license.

6. The multimedia content management system according to claim 5, wherein the multimedia contents converted by the server are encrypted and transmitted.

7. The multimedia content management system according to claim 6, wherein the client is additionally operable to receive a license translated to be suitable for the client of the intranet by the server.

8. The multimedia content management system according to claim 5, wherein the client further comprises:

an authentication and access control unit operable to perform registration of the client on the server and access to the server;

a content decryption unit operable to decrypt the multimedia contents which are encrypted and transmitted.

9. The multimedia content management system according to claim 8, wherein the encryption of the multimedia contents is performed using a group key of the server.

10. The multimedia content management system according to claim 9, wherein the decryption is performed using a client key corresponding to the group key of the server.

11. The multimedia content management system according to claim 8, wherein the client further comprises a report unit for reporting usage details of the transmitted multimedia contents to the server.

12. A method of managing multimedia contents in an intranet, comprising:

a server, comprising a processor and a memory, of the intranet performing communication relating to services with the corresponding DRM server group according to the DRM solution of the received multimedia contents if receiving multimedia contents from one of a plurality of DRM server groups having a unique DRM solution respectively, converting the received multimedia contents into multimedia contents having a format suitable for at least one client of the intranet and transmitting the converted multimedia contents to the client;

wherein the server comprises a plurality of proxy managers constructed according to DRM server groups, the proxy managers each comprising:

a platform authentication unit operable to request a license for multimedia contents from a corresponding DRM server group which provides the multimedia contents, and performing registration of the client;

a content conversion unit operable to decrypt multimedia contents received from the corresponding DRM server group, and converting the decrypted multimedia contents into multimedia contents having a format suitable for the client; and a license translation unit operable to translate a license received from the corresponding DRM server group into a license having a format suitable for the client, encrypting the converted multimedia contents, wherein each DRM server group has the unique DRM solution to be executable on different applications, and wherein the encryption is performed using a group key of the server.

13. The multimedia content management method according to claim 12, further comprising translating a license received through the Internet to be suitable for the client of the intranet and transmitting the translated license to the client by the server.

14. The multimedia content management method according to claim 13, further comprising encrypting the translated license and transmitting the encrypted license to the client.

15. The multimedia content management method according to claim 12, further comprising:

receiving multimedia content usage details of the client by the server; and arranging the multimedia content usage details of the client and transmitting the arranged multimedia content usage details to a DRM server group.

16. The multimedia content management method according to claim 15, further comprising transmitting information relating to billing to the DRM server group by the server.

17. A method of managing multimedia contents in an intranet, comprising:

receiving and executing multimedia contents, converted by a server, comprising a processor and a memory, of the intranet into multimedia contents having a format suitable for at least one client of the intranet, by the client, wherein if the server receives multimedia contents from one of a plurality of DRM server groups having a unique DRM solution respectively, the server performs communication relating to services with the corresponding DRM server group according to the DRM solution of the received multimedia contents, converts the received multimedia contents into multimedia contents having a format suitable for at least one client of the intranet and transmits the converted multimedia contents to the client;

wherein the server comprises a plurality of proxy managers constructed according to DRM server groups, the proxy managers each comprising:

a platform authentication unit operable to request a license for multimedia contents from a corresponding DRM server group which provides the multimedia contents, and performing registration of the client;

a content conversion unit operable to decrypt multimedia contents received from the corresponding DRM server group, and converting the decrypted multimedia contents into multimedia contents having a format suitable for the client; and a license translation unit operable to translate a license received from the corresponding DRM server group into a license having a format suitable for the client, wherein each DRM server group has the unique DRM solution to be executable on different applications, wherein the license translated by the server is encrypted and transmitted to the client; and wherein the encryption of the license is performed using a group key of the server; and checking whether the decrypted multimedia contents are executed in the client to be suitable for a decrypted license.

18. The multimedia content management method according to claim 17, wherein the multimedia contents converted by the server are encrypted and transmitted.

19. The multimedia content management method according to claim 18, further comprising receiving a license translated to be suitable for the client of the intranet by the server.

20. The multimedia content management method according to claim 17, further comprising:

decrypting the encrypted multimedia contents; and decrypting the encrypted license.

21. The multimedia content management method according to claim 20, wherein the encryption of the multimedia contents is performed using a group key of the server.

22. The multimedia content management method according to claim 21, wherein the decryption is performed using a client key corresponding to the group key of the server.

23. The multimedia content management method according to claim 20, further comprising reporting usage details of the transmitted multimedia contents to the server.

24. The multimedia content management system according to claim 10, wherein said client key is assigned to register DRM smart clients through the platform authentication and access control unit.

* * * * *